US012800125B2

(12) United States Patent
Kozub et al.

(10) Patent No.: US 12,800,125 B2
(45) Date of Patent: Nov. 17, 2026

(54) ILLUMINATED EMBLEM FOR VEHICLES AND RELATED MANUFACTURING METHOD

(71) Applicant: MARELLI AUTOMOTIVE LIGHTING ITALY S.p.A., Venaria Reale Turin (IT)

(72) Inventors: Bartosz Kozub, Sosnowiec (PL); Damian Sołtan, Sosnowiec (PL); Stefano Marchesin, Tolmezza (IT)

(73) Assignee: MARELLI AUTOMOTIVE LIGHTING ITALY S.p.A., Venaria Reale (IT)

(*) Notice: Subject to any disclaimer, the term of this patent is extended or adjusted under 35 U.S.C. 154(b) by 0 days.

(21) Appl. No.: 19/310,429

(22) Filed: Aug. 26, 2025

(65) Prior Publication Data

US 2026/0063269 A1 Mar. 5, 2026

(30) Foreign Application Priority Data

Aug. 27, 2024 (EP) .................................... 24196717

(51) Int. Cl.
*F21S 43/50* (2018.01)
*B60R 13/00* (2006.01)
(Continued)

(52) U.S. Cl.
CPC ............ *F21S 43/50* (2018.01); *B60R 13/005* (2013.01); *F21S 43/14* (2018.01); (Continued)

(58) Field of Classification Search
CPC ...... F21S 43/50; F21S 43/14; F21S 43/26241; F21S 43/26411; B60R 13/005; F21W 2104/00; F21Y 2115/10
See application file for complete search history.

(56) References Cited

U.S. PATENT DOCUMENTS

2012/0182722 A1* 7/2012 Wu ......................... F21S 43/26
362/157
2017/0355302 A1 12/2017 Kuramitsu et al.
(Continued)

FOREIGN PATENT DOCUMENTS

CN 114103826 A 3/2022
CN 115871569 A * 3/2023 ........... B60R 13/005
(Continued)

OTHER PUBLICATIONS

Communication mailed Feb. 14, 2025 for European Application No. 24196717.3 transmitting the European Search Report and Opinion dated Jan. 31, 2025.

*Primary Examiner* — Christopher E Dunay
(74) *Attorney, Agent, or Firm* — Howard & Howard Attorneys PLLC

(57) ABSTRACT

An illuminated emblem for vehicles comprising a container body delimiting a cavity, a lighting device comprising at least one lighting source, at least partially housed in said cavity and configured to emit at least one light beam, an inner lens to cover at least partially said lighting source, the inner lens comprising a first transparent layer and a second diffusing or opalescent layer, said first transparent layer and second diffusing or opalescent layer being mutually integral. The container body comprises at least one protrusion which at least partially crosses the cavity and abuts against a fixing portion of the inner lens with which it forms a laser welding joint, said fixing portion being in contact with the first transparent layer or with the second diffusing or opalescent layer, an outer lens superimposed to cover at least partially the inner lens and to close at least partially the cavity.

16 Claims, 3 Drawing Sheets

(51) Int. Cl.

| | |
|---|---|
| ***F21S 43/14*** | (2018.01) |
| ***F21S 43/20*** | (2018.01) |
| *F21W 104/00* | (2018.01) |
| *F21Y 115/10* | (2016.01) |

(52) U.S. Cl.
CPC ... *F21S 43/26241* (2024.05); *F21S 43/26411* (2024.05); *F21W 2104/00* (2018.01); *F21Y 2115/10* (2016.08)

(56) References Cited

U.S. PATENT DOCUMENTS

| | | | | |
|---|---|---|---|---|
| 2019/0031118 | A1* | 1/2019 | Sanahuja Clot | B60R 19/52 |
| 2022/0048444 | A1* | 2/2022 | Mayer Pujadas | F21S 43/239 |
| 2025/0018879 | A1* | 1/2025 | Kuramitsu | H01Q 1/42 |
| 2025/0065820 | A1* | 2/2025 | Stietenroth | G09F 13/044 |
| 2025/0155100 | A1* | 5/2025 | Hayashi | F21S 41/334 |
| 2025/0388180 | A1* | 12/2025 | Nakaishi | B60R 13/005 |
| 2026/0009518 | A1* | 1/2026 | Tanaka | F21S 43/51 |
| 2026/0029098 | A1* | 1/2026 | Ademuwagun | F21S 41/2805 |

FOREIGN PATENT DOCUMENTS

| | | | |
|---|---|---|---|
| CN | 117246228 | A | 12/2023 |
| CN | 117508043 | A | 2/2024 |

* cited by examiner

ILLUMINATED EMBLEM FOR VEHICLES AND RELATED MANUFACTURING METHOD

CROSS-REFERENCE TO RELATED APPLICATION

This application claims priority pursuant to 35 U.S.C. 119 (a) to European Patent Office Application No. 24196717.3, filed Aug. 27, 2024, which application is incorporated herein by reference in its entirety.

FIELD

The present invention relates to aesthetic and functional components for vehicles, with reference to emblems and logos, which not only serve to identify the brand of the associable vehicle, but also add aesthetic value by illuminating the emblems and logos themselves.

BACKGROUND

As is known, the illumination of automotive emblems or logos is becoming more popular, with the goal of highlighting the vehicle brand and providing a characteristic visual appearance during the night or under low lighting conditions.

An illuminated emblem is not limited to distinguishing the brand, but it enriches the appearance of the vehicle using light. Historically, different materials and methods for maximizing the lighting effect and facilitating the production of these lighting devices have been explored. Previous attempts have used polymer materials having a milky or opaline appearance, combined with laser welding techniques for assembling such devices.

However, the employment of powerful laser sources for welding these opalescent materials has raised questions concerning energy efficiency and sustainability of the production costs.

In greater detail, already known designs of illuminated car emblems use components made of polymer materials, such as polymethylmethacrylate (PMMA) and polycarbonate (PC), combined with substances which diffuse light to create a milky effect. These designs also include techniques of assembling such components made of opalescent polymers, for facilitating the manufacturing process, in which fastening such components inside the emblem by means of a laser welding process is contemplated. An example of this is described in Chinese Patent Application CN115871569A.

SUMMARY

The present invention broadly describes an illuminated emblem for vehicles comprising a container body delimiting a cavity, a lighting device comprising at least one lighting source, at least partially housed in said cavity and configured to emit at least one light beam, an inner lens to cover at least partially said lighting source, the inner lens comprising a first transparent layer and a second diffusing or opalescent layer, said first transparent layer and second diffusing or opalescent layer being mutually integral. The container body comprises at least one protrusion which at least partially crosses the cavity and abuts against a fixing portion of the inner lens with which it forms a laser welding joint, said fixing portion being in contact with the first transparent layer or with the second diffusing or opalescent layer, an outer lens superimposed to cover at least partially the inner lens and to close at least partially the cavity, the outer lens comprising an inner face facing the second diffusing or opalescent layer of the inner lens. Said inner face is metalized and/or opaque to the light beam of the at least one lighting source and has at least one path or transparent image to said light beam, not affected by metalized or opaque portions to the light beam, to allow the passage of the light beam emitted by the at least one lighting source.

Previous approaches require the use of particularly intense laser sources for welding.

Indeed, during the laser welding process, the component made from opalescent polymers is irradiated by a laser beam to be firmly joined to the container body, which acts as a laser beam absorber. However, this specific opalescent component has the peculiarity of absorbing a considerably larger amount of laser energy than that absorbed by a transparent component made from similar polymers but without the particles which diffuse the light thereof.

Accordingly, to operate effectively, it is essential to use more powerful laser sources, which results in higher costs and less efficiency during the production of the illuminating emblem.

Moreover, there is also the risk of damaging the opalescent layer since the latter tends to heat up significantly when it is crossed by the laser beam which must then impact the container body, arranged behind it, and weld it.

Therefore, the solutions of the prior art are not capable of solving the above-mentioned technical problems. Therefore, the need is felt to solve the drawbacks and limitations mentioned with reference to prior art, by providing an emblem or logo provided with means capable of effectively diffusing a milky-shaded light while ensuring an effective and robust coupling thereof to the housing.

Such a need is met by an illuminated emblem for vehicles according to claim 1, and by a method of assembling an illuminated emblem for vehicles according to claim 14.

BRIEF DESCRIPTION OF THE DRAWINGS

Further features and advantages of the present invention will be more comprehensible from the following description of preferred, non-limiting embodiments thereof, in which.

The elements or parts of elements common to the embodiments described below will be indicated by the same reference numerals.

DETAILED DESCRIPTION OF THE INVENTION

Figure 1:
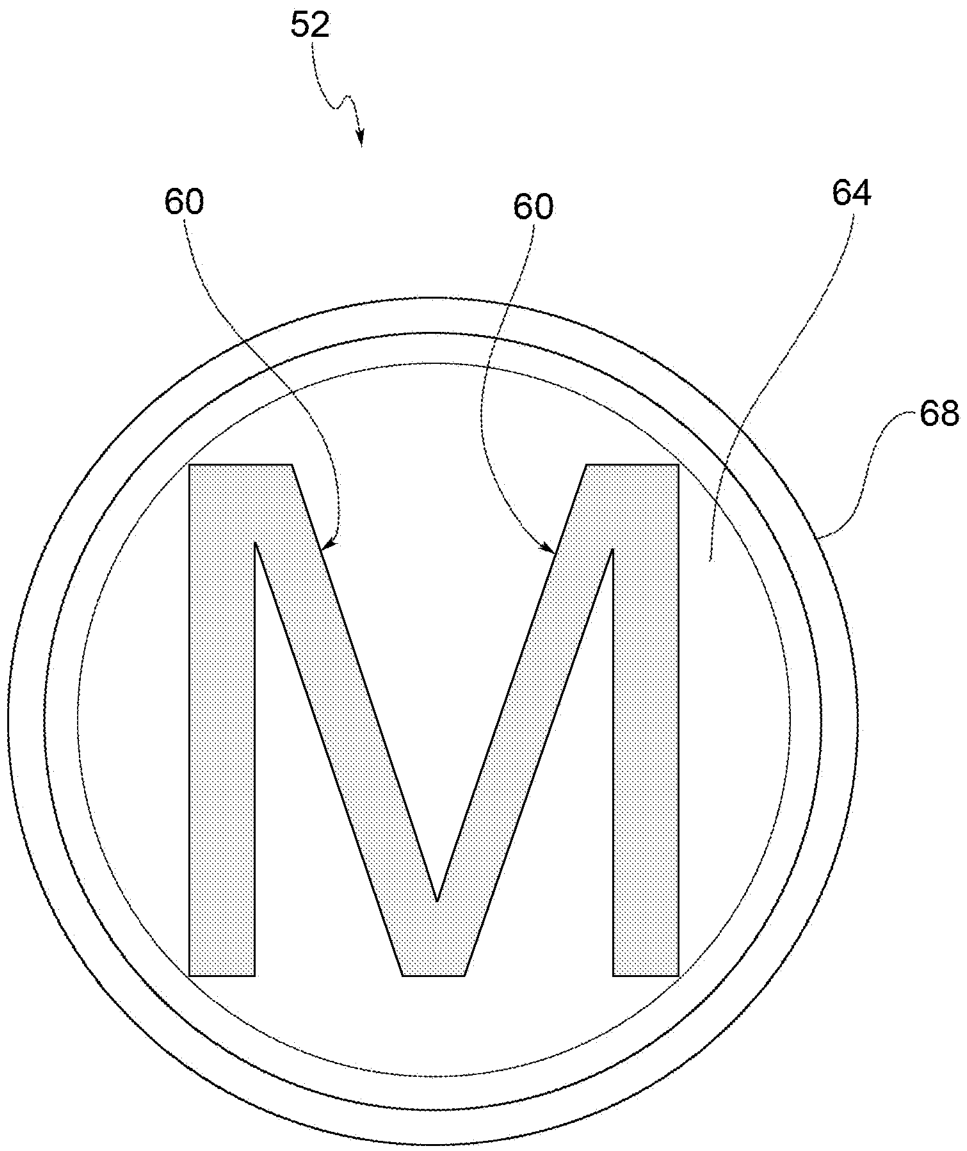
FIG. 1 is a front view, in an assembled configuration, of an illuminated emblem for vehicles according to a possible embodiment of the present invention.
Figure 2:
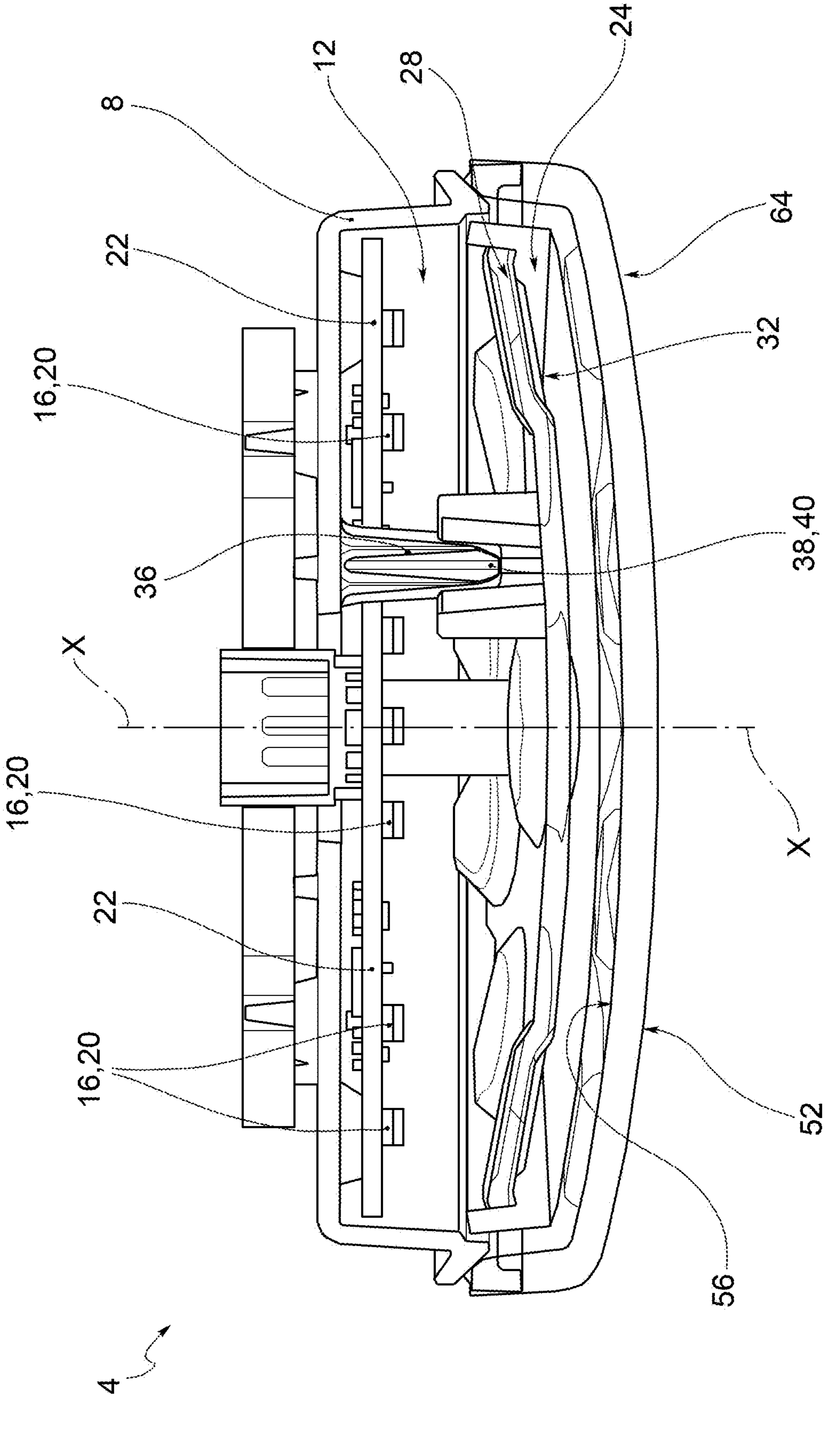
FIG. 2 is a section view of the emblem in FIG. 1.
Figure 3:
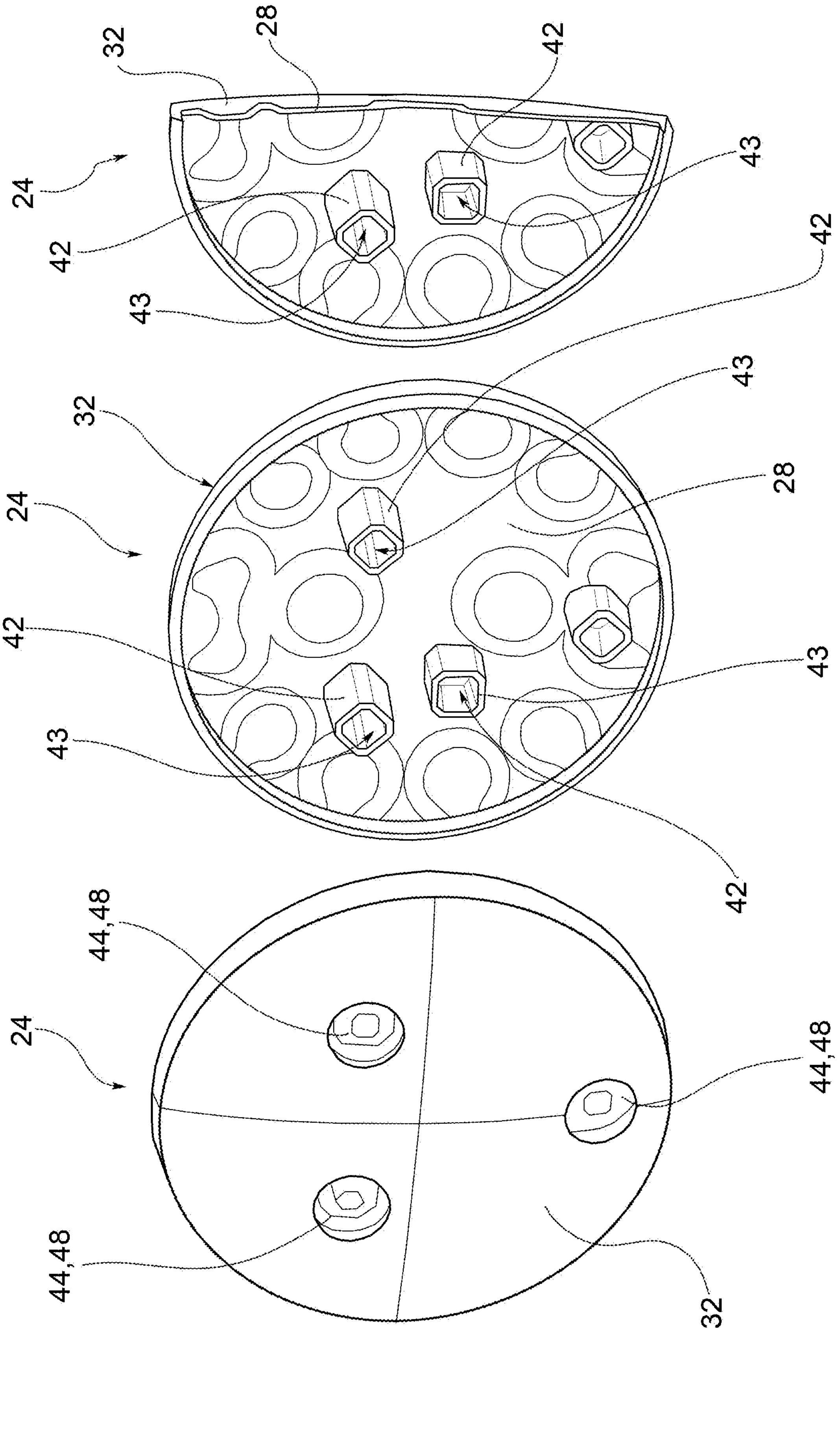
FIG. 3 shows different views of an inner lens of the illuminated emblem for vehicles in FIG. 1.

With reference to the aforesaid drawings, an illuminated emblem for vehicles is indicated by reference numeral 4.

The illuminated emblem 4 for vehicles comprises a container body 8 which delimits a cavity 12. Preferably, container body 8 is made of an opaque polymer material, for example of a material absorbing a laser welding beam, e.g., of acrylonitrile-butadiene-styrene (ABS), as better described below.

The illuminated emblem 4 further comprises a lighting device 16 comprising at least one lighting source 20, at least partially housed in said cavity 12 and configured to emit at least one light beam. Preferably, said at least one lighting source 20 is an LED lighting source. In any case, it is possible to use any lighting source 20 adapted to emit a light beam, when activated.

Possible power supply circuits 22 of the lighting source 20 are preferably housed inside the same cavity 12.

The illuminated emblem 4 further comprises an inner lens 24 to cover at least partially said lighting source 20.

The inner lens 24 comprises a first transparent layer 28 facing the lighting source 20, and a second diffusing or opalescent layer 32 associated with said first transparent layer 28. For example, the second diffusing or opalescent layer 32 can be superimposed on said first transparent layer 28 on the side opposite to the lighting source 20. According to a further embodiment, the first transparent layer 28 and the second diffusing or opalescent layer 32 can at least partially interpenetrate each other, i.e., placed side-by-side rather than superimposed, as better described below. It is worth noting that the term "transparent" means a material allowing for a clear view therethrough.

According to a possible embodiment, said first transparent layer 28 and second diffusing or opalescent layer 32 of the inner lens 24 are co-molded with each other.

A known technique for co-molding the first transparent layer 28 and the second diffusing or opalescent layer 32 of the inner lens 24 is the so-called injection "skin molding", in which the first transparent polymer layer 28 (skin) is superimposed on the second diffusing or opalescent layer 32. In practice, the polymer material relating to one of the two layers is injected into the mold, and then the polymer material relating to the other layer is injected after a brief interval.

Preferably, the first transparent layer 28 of the inner lens 24 is made of transparent polymethylmethacrylate (PMMA), while the second diffusing and opalescent layer 32 is formed from opalescent polymers based on PMMA, but for example treated with the addition of particles, such as PMMA with silica nanoparticles (SiO2), or PMMA with glass beads or other reflecting microparticles, or even PMMA with block polymers, and similar known ones. However, it is possible to use different transparent polymer materials, e.g., polycarbonate (PC), for making the first transparent layer 28 and the second diffusing or opalescent layer 32, having transparent and milky features, respectively.

It should be noted that, in an embodiment of the invention, the first transparent layer 28 directly receives the light beam emitted by the at least one lighting source 20 directly facing it and transmits it to the second diffusing or opalescent layer 32, which serves to emit a milky light beam output from cavity 12.

Advantageously, the container body 8 comprises at least one protrusion 36 which at least partially crosses the cavity 12 and abuts against a fixing portion 40 of the inner lens 24, intended to anchor, i.e., fasten, the inner lens 24 with the container body 8. The fixing portion 40 of the inner lens comprises at least one boss 42 obtained in the first transparent layer 28 of the inner lens 24. In greater detail, according to a possible embodiment, the first transparent layer 28 can be associated with the at least one boss 42 delimiting a seat 43 configured to accommodate at least partially said protrusion 36. The coupling between the protrusion 36 and the seat 43 thus allows obtaining the correct alignment between the inner lens 24 and the container body 8 prior to the respective fastening by welding.

The fixing portion 40 further comprises at least one through cavity 44 and/or one transparent portion 48 obtained in the diffusing or opalescent layer 32. In a specific implementation of the invention, it is possible to create the through cavity 44 by making a through hole through the second diffusing or opalescent layer 32. The through cavity 44 obtained in the diffusing or opalescent layer 32 is substantially aligned with the boss 42 obtained in the first transparent layer 28 of the inner lens, along a welding axis. In a further alternative embodiment of the inner lens formed from milky and transparent polymer materials, the through cavity 44 of the second diffusing or opalescent layer 32 can be filled with or replaced by a transparent portion 48 relating to the first transparent layer 28, as shown and detailed therein.

The through cavity 44 of the second diffusing or opalescent layer 32 and/or the transparent portion 48 of the first transparent layer 28 allow a laser welding beam to cross the second diffusing or opalescent layer 32 of the inner lens 24 without any energy absorption, and to reach the first transparent layer 28 of the inner lens 24 which, since it is transparent to the same laser beam, is further crossed without being substantially absorbed. Finally, the laser welding beam impacts on a free or distal end 38 of protrusion 36 consisting instead of an absorbent material, which overheats and at least partially melts, welding locally with the first transparent layer 28 to form a laser welding joint.

The inner lens 24 formed by a first transparent layer 28 surmounted by a second diffusing or opalescent layer 32 for the optimized diffusion of the light has the peculiar feature of having at least one through cavity, or hole, 44, for example three through cavities, or holes, 44 made in the second diffusing or opalescent layer 32, arranged so as to allow the passage of a laser radiation directed towards the first transparent layer 28 underneath the inner lens 24. For example, at said three through cavities 44 of the second diffusing or opalescent layer 32 of the inner lens, there are formed corresponding, for example, three bosses 42 in the first transparent layer 28 of the inner lens. For example, such three bosses 42 delimit respective, for example, three seats 43 configured to accommodate at least partially respective, for example, three protrusions 36 of the container body, which abut against the fixing portion 40 of the inner lens 24.

As mentioned above, a further version of the invention leads to the creation of the inner lens 24 with a single thickness layer, which however takes shape by joining two different types of polymer materials, the first being transparent, such as PMMA or PC, while the second being opalescent in nature, such as PMMA or PC, treated with the addition of particles, as described above. The first transparent polymer material and the second diffusing or opalescent polymer material are accurately assembled next to each other along the margins thereof by means of an edge-to-edge joining process. This technique, known as edge-to-edge co-molding, focuses on simultaneous or sequential co-molding of the first transparent polymer material and the second diffusing or opalescent polymer material so that the latter form a single piece along a common edge rather than being superimposed. In the construction of the inner lens 24, the opalescent polymer material predominates in constructing the essence, i.e., the body, of the lens surface, thus ensuring that diffusion of light characteristic of opalescence. Simultaneously, the transparent polymer is strategically positioned in specific and circumscribed areas, serving to create small transparency windows to a laser radiation, i.e., transparent portions 48 preferably extending for the entire thickness of the second diffusing or opalescent layer 32.

In other words, the first transparent layer 28 is at least partially interpenetrated inside the second diffusing or opalescent layer 32, in which the interpenetration of the first transparent layer 28 inside the second diffusing or opalescent layer 32 consists in forming at least one transparent portion 48 partially surrounded by the second diffusing or opalescent layer 32. In yet other words, the interpenetration of the first transparent layer 28 in the second diffusing or opalescent layer 32 results in the creation of at least one transparent portion 48, which is partially enveloped by the second diffusing or opalescent layer 32. Accordingly, this transparent portion 48, being set in the second diffusing or opalescent layer 32, is placed edge-to-edge with the latter 32.

Therefore, the inner lens 24 can also be formed with the second diffusing or opalescent layer 32 comprising a transparent portion 48 allowing a laser welding beam to cross the second diffusing or opalescent layer 32 of the inner lens 24 without any energy absorption and to reach the first transparent layer 28 of the inner lens 24.

In other words, it is possible that the inner lens 24 is formed with the first transparent layer 28 superimposed on the second diffusing or opalescent layer 32, having at least one empty through cavity 44, but also that the inner lens 24 is made with a opalescent matrix single layer, i.e., with the second diffusing or opalescent layer 32, in which the through cavity 44 is filled with or replaced by a transparent material 48 relating to the first transparent layer 28, allowing it to be crossed by the laser welding beam substantially without heating up. The transparent material 48 relating to the first transparent layer 28 is placed edge-to-edge with the second diffusing or opalescent layer 32.

As for this latter point, the transparent polymer material 48 relating to the first transparent layer 28 can be co-molded with the diffusing or opalescent polymer material relating to the second diffusing or opalescent layer 32 with the edge-to-edge co-molding technique, as described above, or can also be joined by insertion into said through cavities 44, by means of a known technique.

The through cavities 44 or transparent portions 48 in the diffusing or opalescent layer 32 are strategically sized and positioned to allow the laser welding of the first transparent layer 28 of the inner lens to the container body 8 of the emblem without compromising the integrity or appearance of the emblem itself. This welding method not only ensures a solid and long-lasting fusion between the inner lens 24 and the container body 8 but also allows maintaining a high light diffusion quality due to the properties of the opaline material of the second diffusing or opalescent layer 32 of the inner lens 24.

The combined use of transparent polymer material and an opaline polymer material in the construction of the inner lens 24 provides the dual advantage of excellent light diffusion, required to best highlight the visual features of emblem 4, and at the same time the possibility of using an advanced and efficient laser welding technology. This simplifies the production process, reducing the associated times and costs, while simultaneously ensuring a strong mechanical connection resistant to external agents.

Preferably, it should be noted that at least one protrusion 36, for example three protrusions 36, are misaligned with the path or transparent image 60 to said light beam, with respect to a main propagation direction X-X of the light beam perpendicular to said inner lens 24. The presence itself of at least one protrusion 36 is thus concealed from the outside of emblem 4.

Emblem 4 also comprises a component denoted as an outer lens 52, and can close the container body 8, as in the example shown. However, it is fundamental to note that despite the term "outer", this lens is not mandatorily the lens which seals, closes, the cavity 44 of the container body 8, nor must necessarily act as a direct interface with the external environment. Indeed, the outer lens 52 can also be located inside the cavity 44 of the container body itself. In terms of sequence, with respect to the light flow originating from the lighting source 20, the outer lens 52 is after the inner lens 24 and is positioned opposite thereto. Nonetheless, it 52 could be before another lens (not shown) which is inserted further ahead in the travel of light, perhaps acting as a closing element for the container body 8. Therefore, the attribute "outer" should be understood in relation to the location downstream of lens 52 with respect to the inner lens 24, along the path of the light emitted by the lighting source 20, rather than to the direct exposure thereof to the external environment.

In any case, the primary role assigned to the outer lens 52 is that of defining the visual representation of the emblem or logo, accentuating the distinctive details thereof, as will be apparent in the continuation of the disclosure. Preferably, the outer lens 52 is made of PC and is treated by means of a process known as "hard coating" or "surface hardening treatment". This process is used to apply a protective layer to an outer face of a lens made of polycarbonate intended to be arranged in outdoor environments to improve its resistance to scratches and wear while simultaneously keeping the optical features and appearance of the lens itself unaltered. Obviously, if another lens (not shown) were added, located downstream with respect to the outer lens 52, in the path of light, and which also served the function of sealing the container body 8, the application of a hard coating treatment to the outer lens 52 could be unnecessary.

In particular, the outer lens 52 comprises an inner face 56, facing the second diffusing or opalescent layer 32 of the inner lens 24, in which said inner face 56 is metalized and/or opaque to the light beam of the at least one lighting source 20 and has at least one path or transparent image 60 with respect to said light beam, not affected by metalized or opaque portions to the light beam, so as to allow the passage of the light beam emitted by the at least one lighting source 20. Importantly, the inner face 56 of the outer lens can be metalized or made opaque to the light beam using methods such as metallization—an established technique—or by applying a layer of ink, for example by means of a process known as pad printing. In both cases, or other similar ones, these applications must allow a selective removal thereof to generate thin outlines to compose text or images.

According to an embodiment, the inner face 56 of the outer lens 52 is preferably metalized, and a path or transparent image 60 to said light beam on the inner face 56 is obtained by means of targeted removal of said metalized portions.

Using selective engraving techniques, a path or transparent image 60 characterizing the emblem 4 is indeed obtained from the metalized area. This operation is carried out by strategically removing parts of the metal layer to form the desired image, thus allowing the light to pass through the preferably thin path or transparent image 60.

The engraving techniques used to create thin emblems or drawings on the metalized lenses of an automotive lamp can vary, but one of the most accurate and controlled methods is laser engraving. Laser engraving is based on the use of a high-intensity laser beam for selectively removing material from a surface, here the metalized layer applied to the inner face 56 of the outer lens of the lamp. This method allows for accurate removal, creating fine and complex details which would be difficult, if not impossible, to create with more conventional methods.

On the other hand, the unremoved metallization on the inner face 56 of the outer lens advantageously allows maintaining a high visual quality of the emblem under OFF conditions. Indeed, the metal layer on the inside of the surface of the outer lens 52, i.e., on the inner face 56 of the outer lens 52, creates a finish which gives the outer lens a distinctive and metallically reflecting appearance when observed from the outside, while the lighting source 20 is OFF.

On the other hand, when the lighting source 20 is activated, the inner face 56 of the outer lens 52 is not crossed by the light beam emitted by the lighting source 20, except for the at least one path or transparent image 60. Such a path or transparent image 60 thus represents the outline of the emblem or logo intended to be illuminated because the light beam emitted by the at least one lighting source 20, after crossing the inner lens 24, is diffused and impacts on the inner face 56 of the outer lens 52 which blocks it at the metalized and/or opaque portion; therefore, the light beam can cross the inner face 56 of the outer lens 52 only at said path or transparent image 60, thus creating a thin and refined finish characteristic of the emblem or logo.

The combination of these elements of the outer lens 52, i.e., metallization and selective engraving, results in a product which not only is effective in the visual use of the emblem when ON but also provides a unique and distinctive aesthetic appeal even when OFF.

According to an embodiment, the outer lens 52 is laser or hot-plate or vibration welded onto the container body 8.

In order to allow the laser welding of the outer lens 52 onto the container body 8, the outer lens 52 has a peripheral edge 68 not affected by metalized or opaque portions to the light beam, said peripheral edge 68 being transparent to a laser welding beam so as to allow it to be laser welded onto the container body 8, sending the laser beam from the outside of the emblem 4, on the side of the outer face 64. In other words, the laser beam engraves and crosses the peripheral edge 68 without being absorbed, and then impacts on the container body 8, formed from an absorbent material, which overheats and melts, thus welding to the inner layer 56 of the outer lens 52.

The method of welding the emblem or logo, and particularly the inner lens 24, according to the present invention will now be described.

In particular, the method of assembling an illuminated emblem 4 for vehicles according to the invention comprises the steps of providing a container body 8 delimiting a cavity 12, providing a lighting device 16 comprising at least one lighting source 20 at least partially housed in said cavity 12 and configured to emit at least one light beam. Therefore, an inner lens 24 to cover at least partially said lighting source 20 is provided. The inner lens 24 can comprise a first transparent layer 28 facing the lighting source 20, and a second diffusing or opalescent layer 32 associated with, for example superimposed on or at least partially interpenetrated with, i.e., placed by the side of, said first transparent layer 28 on the side opposite to the lighting source 20. As shown, the second diffusing or opalescent layer 32 of the inner lens 24 has at least one through cavity 44, or hole, and can be superimposed on the first transparent layer 28.

The method of welding the emblem or logo according to the present invention includes providing the container body 8 comprising at least one protrusion 36 which crosses the cavity 12 and abuts against a fixing portion 40 of the inner lens 24. At said fixing portion 40, the second diffusing or opalescent layer 32 of the inner lens 24 has at least one through cavity 44 and/or one transparent portion 48 to a laser welding beam so that a laser welding beam can cross both the second diffusing and opalescent layer 32 and the first transparent layer of the inner lens 24 without any substantial absorption of laser energy by the opalescent polymer material, and thus reach the protrusion 36 which is intended instead to absorb the laser welding beam so as to melt at least partially and create a welding joint.

As a result, the container body 8 comprises at least one protrusion 36 which at least partially crosses a related through cavity 44 of the second diffusing or opalescent layer 32 of the inner lens 24 and forms a laser welding joint with the first transparent layer 28 of the inner lens.

By keeping all the above-described operations and equipment valid, the suggested method further consists in creating the inner lens 24 using the diffusing or opalescent polymer matrix layer 32 to form the thickness of the inner lens 24. Indeed, small windows that are transparent to laser radiation, i.e., transparent portions 48 formed from a transparent polymer material, are provided within this layer 32. Such transparent portions 48 form, in this further embodiment, the first transparent layer 28 of the inner lens and are conceived to allow the laser beam to cross the inner lens without interacting with the diffusing or opalescent polymer material. The first transparent layer 28 of the inner lens in the form of transparent portions 48, and the diffusing or opalescent polymer matrix layer 32 are in this case placed edge-to-edge with each other rather than superimposed.

If the layers of the inner lens are placed side-by-side, at least one protrusion 36 forms a laser welding joint with the first transparent layer 28 of the inner lens at the related at least one transparent portion 48.

Therefore, it should be noted that the definition of first and second layers 28, 32 of the inner lens in this disclosure means both a superposition and a side-by-side placement thereof, in which, in this case, the first transparent layer 28 blends with at least one transparent portion 48.

In order to allow the laser welding, laser welding equipment (not shown) is thus provided, comprising at least one laser source intended to emit a light radiation, such as a laser beam, and conveyor means for conveying and directing the laser beam towards the through cavity 48 and/or towards the transparent portions 48 of the inner lens 24, separately or simultaneously. Such conveyor means can comprise, for example, optical fibers or a movable robotic arm. The laser beam crosses each through cavity 44 and/or transparent portion 48 of the second diffusing or opalescent layer 48 of the inner lens 24, therefore without affecting the second diffusing or opalescent material layer 32 of the inner lens 24, prior to reaching the free or distal end 38 of the protrusion 36 which is opaque to the laser beam.

The laser beam then softens the latter and a welding joint is formed under the action of the pressing means of the laser welding equipment, at each free or distal end 38 of the opaque protrusion 36 of the container body 8 in contact with the first transparent layer 28 of the inner lens 24, thus firmly joining the inner lens 24 with the container body 8 of emblem 4.

The process of constructing emblem 4 also comprises the step of providing and applying an outer lens 52 to cover the inner lens 24 and close the cavity 12. The outer lens 52 comprises an inner face 56, facing the second diffusing or opalescent layer 32 of the inner lens 24, in which said inner face 56 is metalized or opaque to the light beam of the at least one lighting source 20 and has at least one path or transparent image 60 to said light beam, not affected by metalized or opaque portions to the light beam, so as to allow the passage of the light beam emitted by the at least one lighting source 20.

The welding of the outer lens 52 onto the container body 8 can occur by means of laser or hot-plate welding.

According to an embodiment, the method comprises the step of mutually co-molding said first transparent layer 28 and second diffusing or opalescent layer 32 of the inner lens 24, respectively, which are mutually superimposed with injection skin molding techniques, or are placed edge-to-edge with each other with edge-to-edge injection co-molding techniques or insertion techniques, in which the first transparent layer 28 of the inner lens 24 is a transparent polymer material, e.g., transparent PMMA, and in which the second diffusing or opalescent layer 32 of the inner lens 24 is a diffusing and opalescent polymer material, i.e., having a milky appearance. One of the polymers most used for obtaining opalescent effects is PMMA. Some examples of opalescent polymer systems based on PMMA can be PMMA with silica nanoparticles (SiO2), PMMA with glass beads or other reflecting microparticles, PMMA with block polymers, and similar known ones.

As can be appreciated from the above description, the present invention allows overcoming the drawbacks introduced in the prior art.

Indeed, the invention provides an emblem provided with a housing hermetically closed by an outer lens 52, which can be engraved to give rise to the emblem. In a clear departure from conventional solutions, the emblem incorporates an innovative inner lens 24 studied not only to uniformly diffuse a milky-shaded light, but also to ensure an effective and robust coupling to the container body 8. This inner lens 24, together with the outer lens 52, are harmoniously crossed by the light irradiated by the lighting source 20, preferably of the LED type, conveniently arranged inside the emblem, thus creating a distinctive and eye-catching visual effect.

Advantageously, the advanced injection co-molding technique allows creating a structure of inner lens 24 with a complex design, enriched by a dual layer 28, 32 consisting of a transparent material coupled to another opaline one, superimposed or placed by the side.

These two layers 28, 32 of the inner lens 24 are melted together to form a single element, where the distinctive feature lies in that the transparent layer 28 is not completely concealed by the opalescent layer 32 due to the presence of through cavities 44 and/or transparent portions 48 of the latter. This arrangement allows a unique interaction of light and material, contributing to the visual effect of the emblem. In doing so, although the inner lens 24 provides the capacity of light diffusion, it has through cavities 44 or transparent portions 48 which do not modify, absorb or prevent the flow of light radiation.

The opaque protrusions 36 of the housing, the through cavity 44, and/or the transparent portion 48, accurately selected in number and size, ensure the mechanical resistance of the welded interlock emerging therebetween when the car emblem is activated. This is particularly important given that the emblem must resist stresses such as the vibrations generated by the movement of the moving vehicle.

Such an inner lens 24 of the emblem not only ensures an excellent light diffusion due to the opaline material layer 32, but at the same time also a robust structural integrity of the emblem due to the laser welding between the transparent material layer 28 of the inner lens and the housing.

There are multiple advantages of this invention. First, there is a significant improvement of the emblem obtained due to the inner lens 24, which incorporates a transparent material layer 28 partially co-molded with a diffusing material layer 32. This considerably reduces the need to use high-intensity laser sources for welding, resulting in a reduction in the energy impact and production costs. Moreover, the metallization applied to the inner face 56 of the outer lens increases the possibility of customizing the appearance, allowing a free expression of the brand through the emblem design. The assembly, made simple and accurate by the compatibility of the materials and the welding techniques, ensures long-lasting optical quality and resistance to mechanical stresses.

This invention is a qualitative leap in the design and production of illuminated automotive emblems suggesting an emblem system which not only increases the vehicle appearance but does so in an efficient and sustainable manner. The result is an emblem that catches the eye, underlining the brand identity by means of a distinctive play of light, is long-lasting and flexible in applications.

To meet contingent, specific needs, those skilled in the art may make several changes and variations to the solutions described above.

The scope of protection of the present invention is defined by the following claims.

REFERENCE SYMBOLS

4 Illuminated emblem for vehicles
8 Container body
12 Cavity
16 Lighting device
20 Lighting source
22 Power supply circuits
24 Inner lens
28 First transparent layer
32 Second diffusing or opalescent layer
36 Protrusion
38 Free or distal end
40 Fixing portion
42 Boss
43 Seat
44 Through cavity
48 Transparent portion
52 Outer lens
56 Inner face
60 Path or transparent image
64 Outer face
68 Peripheral edge
X-X Internal propagation direction

What is claimed is:

1. An illuminated emblem for vehicles comprising:

a container body delimiting a cavity;

a lighting device comprising at least one lighting source, at least partially housed in said cavity and configured to emit at least one light beam;

an outer lens, placed to close at least partially the cavity, said outer lens comprising at least one path or transparent image which allows the light beam emitted by the at least one lighting source to pass through or cross said outer lens; and, an inner lens having features of opalescent or milky light diffusion and interposed between the lighting source and the outer lens, said illuminated emblem being wherein the inner lens comprises a first transparent layer and a second diffusing or opalescent layer, said first transparent layer and second diffusing or opalescent layer being mutually integral, said first transparent layer forming a laser welding joint with the container body at a fixing portion; and wherein the container body comprises at least one protrusion which at least partially crosses the cavity and forms said laser welding joint with the first transparent layer of the inner lens, at the fixing portion of the inner lens.

2. The illuminated emblem for vehicles according to claim 1, wherein said first transparent layer is at least partially superimposed on said second diffusing or opalescent layer, said second diffusing or opalescent layer comprising at least one through cavity defining the fixing portion.

3. The illuminated emblem for vehicles according to claim 1, wherein said first transparent layer is at least partially interpenetrated with said second diffusing or opalescent layer, said interpenetration of the first layer inside said second diffusing or opalescent layer being defined by at least one transparent portion at least partially surrounded by said second diffusing or opalescent layer, said at least one transparent portion being placed by the side of the latter and defining the fixing portion.

4. The illuminated emblem for vehicles according to claim 1, wherein at said fixing portion, the inner lens has at least one through cavity on the second diffusing or opalescent layer, the protrusion being aligned with said at least one through cavity.

5. The illuminated emblem for vehicles according to claim 4, wherein said at least one protrusion is misaligned with said path or transparent image to said light beam, with respect to a main propagation direction X-X of the light beam perpendicular to said inner lens.

6. The illuminated emblem for vehicles according to claim 1, wherein at said fixing portion, the inner lens has at least one transparent portion on the first transparent layer, the protrusion being aligned with said at least one transparent portion.

7. The illuminated emblem for vehicles according to claim 6, wherein said at least one protrusion is misaligned with said path or transparent image to said light beam, with respect to a main propagation direction X-X of the light beam perpendicular to said inner lens.

8. The illuminated emblem for vehicles according to claim 1, wherein said at least one protrusion is misaligned with said path or transparent image to said light beam, with respect to a main propagation direction X-X of the light beam perpendicular to said inner lens.

9. The illuminated emblem for vehicles according to claim 1, wherein at least one boss delimiting a seat configured to accommodate at least partially said protrusion is associated with the first transparent layer.

10. The illuminated emblem for vehicles according to claim 1, wherein said outer lens is superimposed to cover at least partially the inner lens, the outer lens comprising an inner face facing the second diffusing or opalescent layer of the inner lens, wherein said inner face is metalized and/or opaque to the light beam of the at least one lighting source and has said at least one path or transparent image to said light beam, not affected by metalized or opaque portions to the light beam, so as to allow the passage of the light beam emitted by the at least one lighting source.

11. The illuminated emblem for vehicles according to claim 10, wherein said path or transparent image to said light beam on the inner face is obtained by means of targeted removal of metalized or opaque portions to the light beam.

12. The illuminated emblem for vehicles according to claim 1, wherein said first transparent layer and second diffusing or opalescent layer are co-molded to each other.

13. The illuminated emblem for vehicles according to claim 1, wherein the outer lens is formed from polycarbonate and comprises an outer face treated with a hard coating, opposite to said metalized inner face, on which the path or transparent image is formed.

14. The illuminated emblem for vehicles according to claim 1, wherein the outer lens has a peripheral edge not affected by metalized or opaque portions to the light beam, said peripheral edge being transparent to a laser welding beam so as to allow it to be laser welded onto the container body.

15. An illuminated emblem for vehicles comprising:

a container body delimiting a cavity;

a lighting device comprising at least one lighting source, at least partially housed in said cavity and configured to emit at least one light beam;

an outer lens, placed to close at least partially the cavity, said outer lens comprising at least one path or transparent image which allows the light beam emitted by the at least one lighting source to pass through or cross said outer lens; and, an inner lens having features of opalescent or milky light diffusion and interposed between the lighting source and the outer lens, said illuminated emblem being wherein the inner lens comprises a first transparent layer and a second diffusing or opalescent layer, said first transparent layer and second diffusing or opalescent layer being mutually integral, said first transparent layer forming a laser welding joint with the container body at a fixing portion;

wherein said first transparent layer is at least partially superimposed on said second diffusing or opalescent layer, said second diffusing or opalescent layer comprising at least one through cavity defining the fixing portion; and wherein the container body comprises at least one protrusion which at least partially crosses the cavity and forms said laser welding joint with the first transparent layer of the inner lens, at the fixing portion of the inner lens.

16. An illuminated emblem for vehicles comprising:

a container body delimiting a cavity;

a lighting device comprising at least one lighting source, at least partially housed in said cavity and configured to emit at least one light beam;

an outer lens, placed to close at least partially the cavity, said outer lens comprising at least one path or transparent image which allows the light beam emitted by the at least one lighting source to pass through or cross said outer lens; and, an inner lens having features of opalescent or milky light diffusion and interposed between the lighting source and the outer lens, said illuminated emblem being wherein the inner lens comprises a first transparent layer and a second diffusing or opalescent layer, said first transparent layer and second diffusing or opalescent layer being mutually integral, said first transparent layer forming a laser welding joint with the container body at a fixing portion;

wherein said first transparent layer is at least partially interpenetrated with said second diffusing or opalescent layer, said interpenetration of the first layer inside said second diffusing or opalescent layer being defined by at least one transparent portion at least partially surrounded by said second diffusing or opalescent layer, said at least one transparent portion being placed by the side of the latter and defining the fixing portion; and wherein the container body comprises at least one protrusion which at least partially crosses the cavity and forms said laser welding joint with the first transparent layer of the inner lens, at the fixing portion of the inner lens.

* * * * *